United States Patent
No (10) Patent No.: US 8,113,540 B2
(45) Date of Patent: Feb. 14, 2012

(54) DRIVER AIRBAG ASSEMBLY

(75) Inventor: Byung Woo No, Seoul (KR)

(73) Assignee: Hyundai Motor Company, Seoul (KR)

( * ) Notice: Subject to any disclaimer, the term of this patent is extended or adjusted under 35 U.S.C. 154(b) by 251 days.

(21) Appl. No.: 12/604,120

(22) Filed: Oct. 22, 2009

(65) Prior Publication Data

US 2010/0207362 A1    Aug. 19, 2010

(30) Foreign Application Priority Data

Feb. 18, 2009    (KR) .................. 10-2009-0013298

(51) Int. Cl.
*B60R 21/203* (2006.01)
*B60R 21/20* (2011.01)
*B60R 21/16* (2006.01)

(52) U.S. Cl. ........................................ 280/731
(58) Field of Classification Search ............... 280/731; B60R 21/203
See application file for complete search history.

(56) References Cited

U.S. PATENT DOCUMENTS

| | | | |
|---|---|---|---|
| 4,148,503 A * | 4/1979 | Shiratori et al. | 280/731 |
| 4,325,568 A * | 4/1982 | Clark et al. | 280/731 |
| 5,085,461 A * | 2/1992 | Shibata | 280/731 |
| 5,280,949 A * | 1/1994 | Manabe | 280/731 |
| 5,314,203 A * | 5/1994 | Adams et al. | 280/728.2 |
| 5,338,906 A * | 8/1994 | Yokota | 200/61.54 |
| 5,431,438 A * | 7/1995 | Manabe | 280/731 |
| 5,542,694 A * | 8/1996 | Davis | 280/728.3 |
| 5,573,268 A * | 11/1996 | Leonelli | 280/731 |
| 5,829,777 A * | 11/1998 | Sakurai et al. | 280/728.2 |
| 5,957,489 A * | 9/1999 | Sahara et al. | 280/731 |
| 6,626,458 B2 * | 9/2003 | Fujita et al. | 280/728.3 |
| 6,837,514 B1 * | 1/2005 | Fujita et al. | 280/731 |
| 6,907,328 B2 * | 6/2005 | Fehr et al. | 701/29 |
| 6,967,296 B2 * | 11/2005 | Kato | 200/61.54 |

* cited by examiner

*Primary Examiner* — Paul N Dickson
*Assistant Examiner* — Joselynn Y Sliteris
(74) *Attorney, Agent, or Firm* — Morgan, Lewis & Bockius LLP

(57) ABSTRACT

A driver airbag assembly may include an airbag cover including a switch insert hole, a cushion module provided in back of the airbag cover and engaged with the airbag cover, a mounting plate coupled to the airbag cover in the back thereof to support a rear end portion of the cushion module between the airbag cover and the mounting plate, and having a wing which extends laterally, and a remote control switch unit having a main body disposed between the airbag cover and the mounting plate, a switch part disposed in the main body and exposed to outside of the airbag cover through the switch insert hole, and a subsidiary body interposed and secured between the main body and the wing of the mounting plate and slidable laterally along the main body to be removable from a predetermined position of the main body.

9 Claims, 10 Drawing Sheets

DRIVER AIRBAG ASSEMBLY

CROSS-REFERENCE TO RELATED APPLICATION

The present application claims priority to Korean Patent Application Number 10-2009-0013298 filed on Feb. 18, 2009, the entire contents of which application is incorporated herein for all purpose by this reference.

BACKGROUND OF THE INVENTION

1. Field of the Invention

The present invention relates to a driver airbag assembly which has a construction in which a remote control switch is installed on an airbag cover.

2. Description of Related Art

Generally, a driver airbag is mounted to the steering wheel of a vehicle, and is deployed immediately in the event of a vehicle collision so as to protect a driver.

Figure 1A:
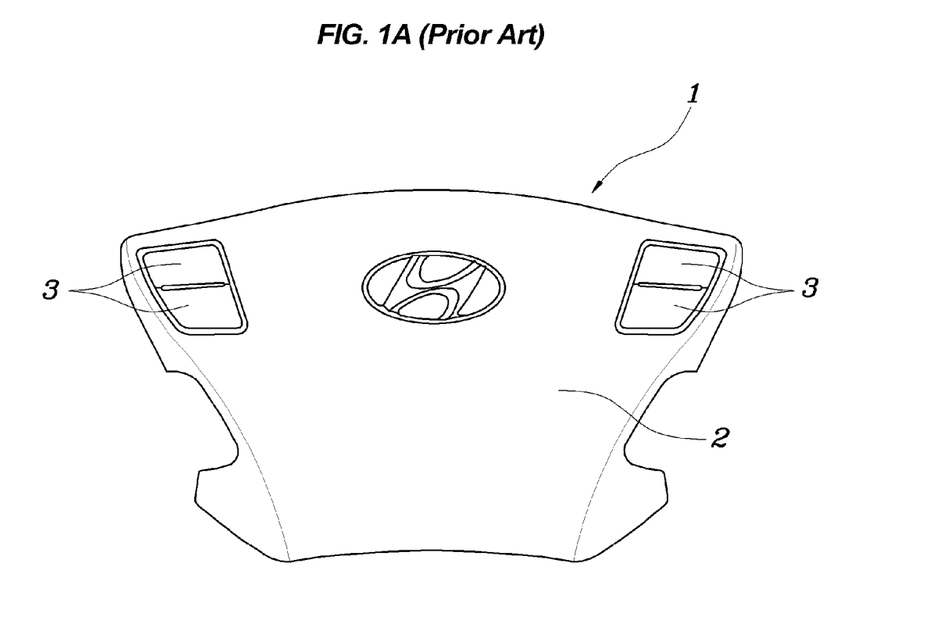
FIG. 1A is a front view illustrating a conventional driver airbag assembly.

Referring to FIG. 1A, in the steering wheel equipped with the driver airbag, a steering wheel cover serves as an airbag cover 2. Remote control switches 3 may be provided on the airbag cover 2 to adjust the volume of an audio system or the like.

Figure 1B:
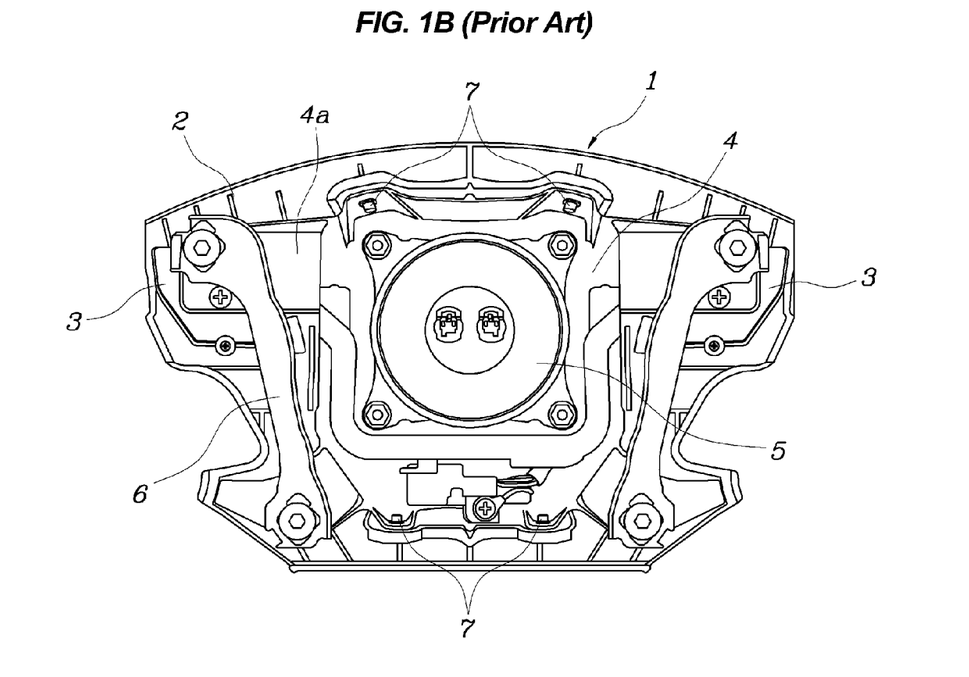
FIG. 1B is a rear view illustrating the driver airbag assembly of FIG. 1A.

The driver airbag is prefabricated in the form of one assembly and supplied to the assembly line of a vehicle. Referring to FIG. 1B, a driver airbag assembly 1 includes a cushion module 5 which is provided on the back of the airbag cover 2, and a mounting plate 4 which is coupled with the airbag cover 2 to cover the cushion module 5. The airbag cover 2 and the mounting plate 4 are fastened to each other via rivets 7 so as to prevent the assembly 1 from becoming disassembled, thus preventing a part from being illegally replaced with another one. Reference numeral 6 denotes a horn plate.

Since each remote control switch 3 is actuated in the manner of a push button, a structure for supporting the rear end of the remote control switch 3 is required. For example, as shown in FIG. 1B, the rear end of the remote control switch 3 may be supported by each of wings 4a which extend leftwards and rightwards from the upper end of the mounting plate 4. However, in this case, it is impossible to separate the airbag cover 2 and the mounting plate 4 from each other, thus making it impossible to separate or replace the remote control switch 3. When the remote control switch 3 is out of order, the whole assembly 1 must be replaced with a new one.

In order to solve the problem, the remote control switch may be directly bolted to the airbag cover, so that it is unnecessary for the remote control switch to be supported by the mounting plate. In this case, the separation or replacement of only the remote control switch is possible. However, the airbag cover to which the remote control switch is mounted must be manufactured through double injection molding so as to reinforce the airbag cover. Consequently, the manufacturing cost of the airbag cover increases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a driver airbag assembly, which is constructed to permit the separation or replacement of a remote control switch mounted to an airbag cover and to provide a driver airbag assembly, which does not require an additional process such as a double injection molding process and has a simple construction so as to prevent manufacturing costs from increasing, in addition to permitting the separation and replacement of a remote control switch.

In an aspect of the present invention, the driver airbag assembly may include an airbag cover including a switch insert hole; a cushion module provided in back of the airbag cover and engaged with the airbag cover; a mounting plate coupled to the airbag cover in the back thereof to support a rear end portion of the cushion module between the airbag cover and the mounting plate, and having a wing which extends laterally; and a remote control switch unit including: a main body disposed between the airbag cover and the mounting plate; a switch part disposed in the main body and exposed to outside of the airbag cover through the switch insert hole; and a subsidiary body interposed and secured between the main body and the wing of the mounting plate and slidable laterally along the main body to be removable from a predetermined position of the main body.

A guide portion may be provided in a rear surface of the main body to receive the subsidiary body such that the subsidiary body slides along the guide portion to be seated at the predetermined position or removed from the predetermined position.

The subsidiary body may be removably secured to the main body and the mounting plate.

A bottom portion of the subsidiary body may be slidably secured to the main body and an upper portion thereof is removably secured to the wing of the mounting plate, wherein a flange protrudes laterally from the subsidiary body along a movement direction of the subsidiary body, and a bracket is provided on the main body corresponding to the flange of the subsidiary body so that the flange is slidably fitted into the bracket, and wherein the upper portion of the subsidiary body is removably secured to the wing of the mounting plate by a bolt.

At least one tube having an internal threaded part may be provided around the guide portion on the rear surface of the main body, and at least one ear part protrudes from a lateral surface of the subsidiary body to be releasably fastened to the tube by a fastening member.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the driver airbag assembly according to the exemplary embodiment of the present invention will be described with reference to the accompanying drawings.

Figure 2:
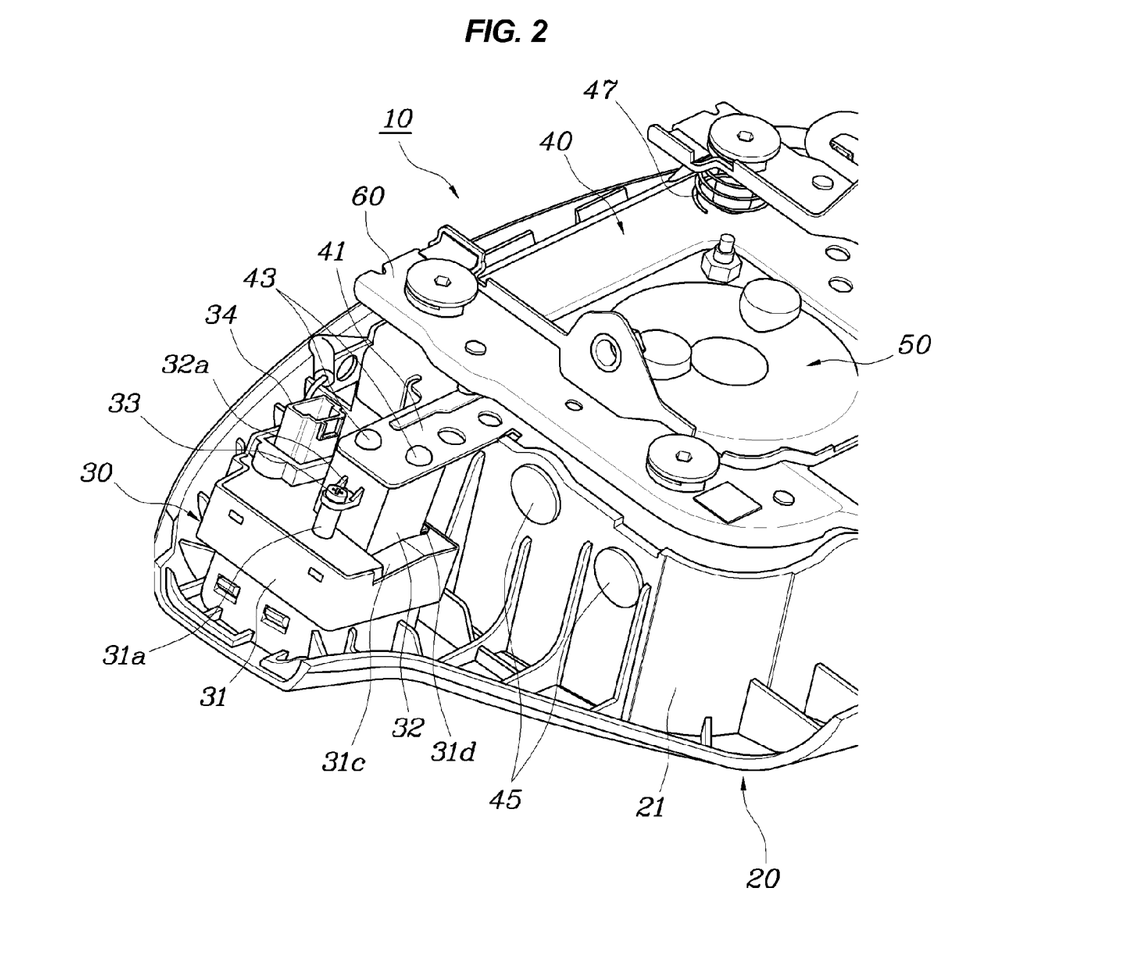
FIG. 2 is a rear view illustrating a driver airbag assembly according to the exemplary embodiment of the present invention.

Referring to FIG. 2, the driver airbag assembly 10 is constructed so that a cushion module 50 is placed between an airbag cover 20 and a mounting plate 40 coupled therewith. The driver airbag assembly 10 is mounted to a steering wheel via a horn plate 60 which is elastically coupled to the mounting plate 40. Remote control switch units 30 are mounted to the airbag cover 20. The rear end of each remote control switch unit 30 is supported by the mounting plate 40. Reference numeral 47 denotes a spring.

Figure 3:
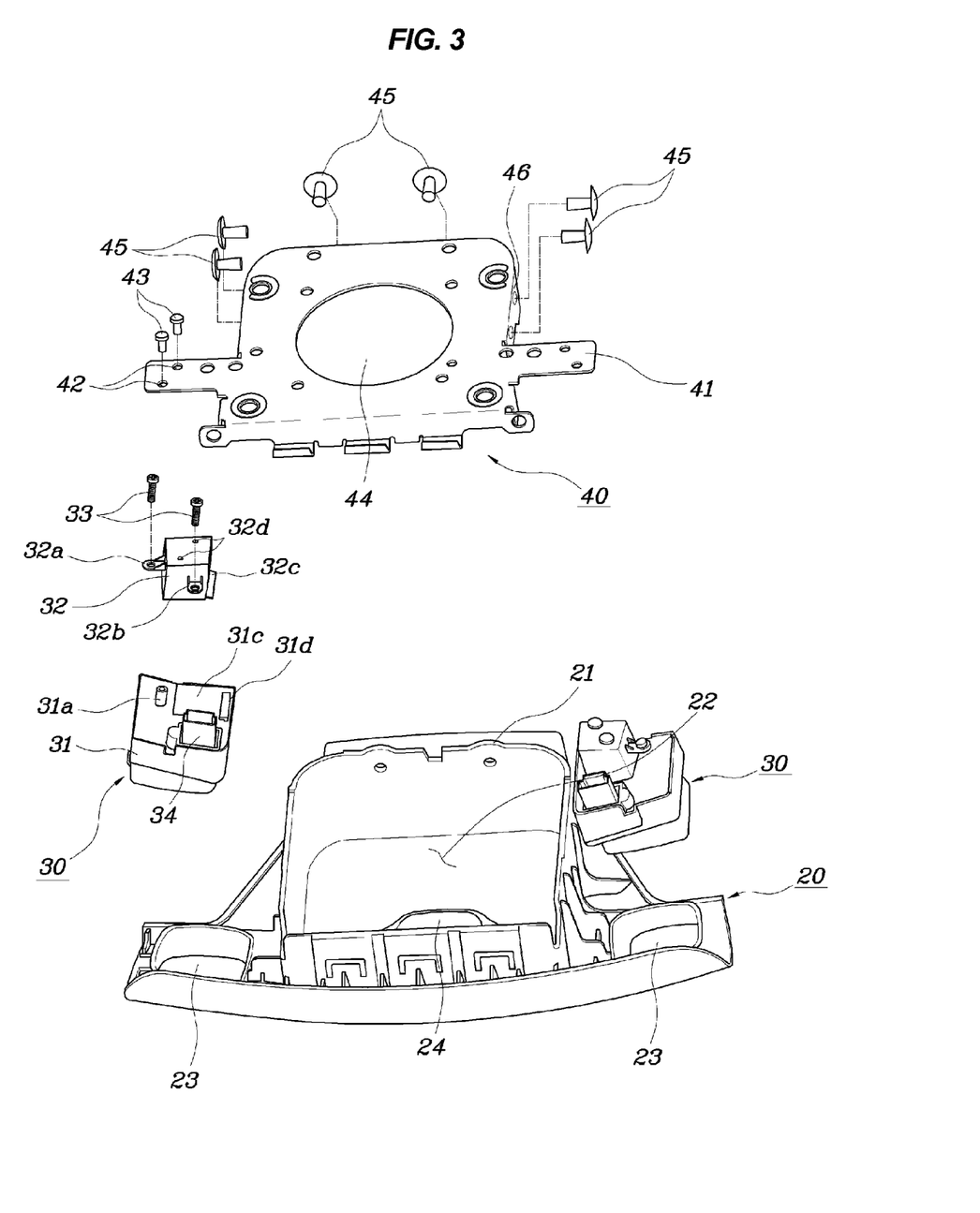
FIG. 3 is an exploded perspective view illustrating the driver airbag assembly of FIG. 2.

Referring to FIGS. 2 and 3, the airbag cover 20 is provided with a central module insert cavity 22 which is surrounded by a wall 21, and two switch insert holes 23 which are provided in the left and right sides of the upper end of the airbag cover 20 so as to mount the remote control switch units 30 to the airbag cover 20. The cushion module 50 is seated in the module insert cavity 22. After the cushion module 50 has been seated, the open side of the module insert cavity 22 is closed by the mounting plate 40. The cushion module 50 is an assembly including a cushion and an inflator, and is omitted in FIG. 3. Reference numeral 24 denotes an emblem mounting hole.

The mounting plate 40 is in close contact with the rear end of the cushion module 50 to support it. Wings 41 are provided on the upper end of the mounting plate 40 in such a way as to extend laterally, and a sidewall 46 is provided on the mounting plate 40 to be fitted into the module insert cavity 22. The mounting plate 40 is placed in back of the airbag cover 20 and is fixedly fastened to the airbag cover 20. In detail, the wall 21 surrounding the module insert cavity 22 and the sidewall 46 are fastened to each other using rivets 45. Thus, unless parts fastened by rivets are broken, it is impossible to separate the airbag cover 20 and the mounting plate 40 from each other. A central hole 44 is formed in the central portion of the mounting plate 40 to be electrically connected to an airbag control unit.

Figure 4:
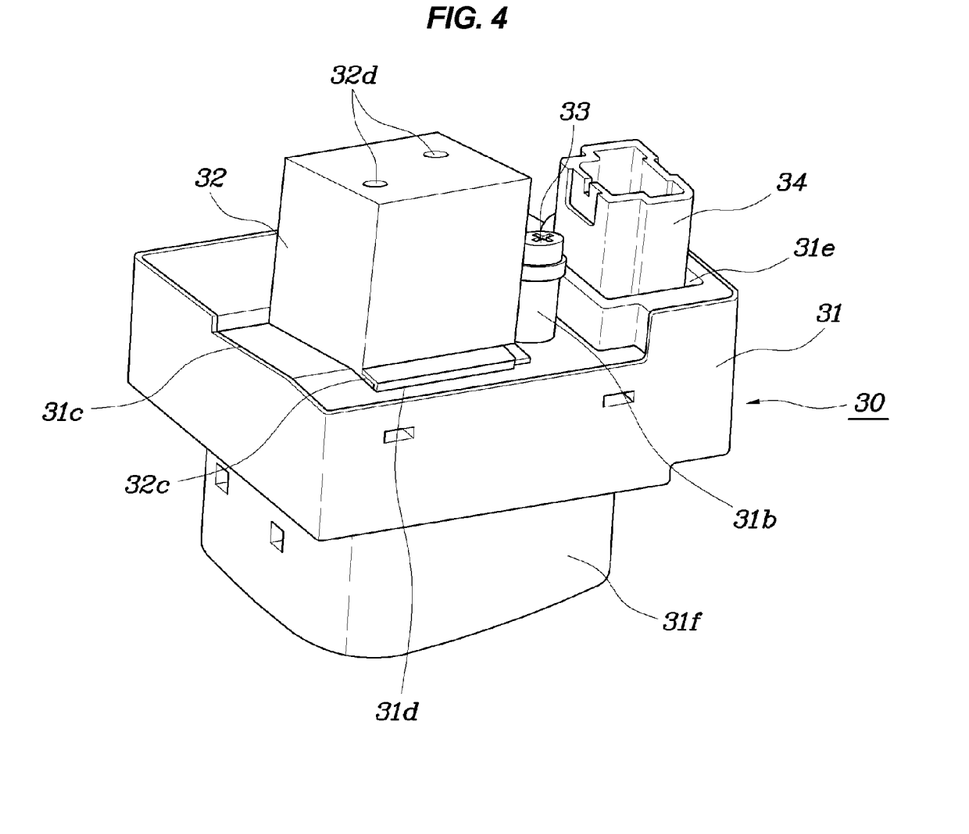
FIG. 4 is a perspective view illustrating a remote control switch unit of FIG. 2.

Referring to FIGS. 2 to 4, each remote control switch unit 30 includes a main body 31 and a subsidiary body 32 which is separable from the main body 31.

The main body 31 is placed on the airbag cover 20 and provided with a switch part 31f which is exposed to the front of the airbag cover 20 through the associated switch insert hole 23 of the airbag cover 20. The switch part 31f has a size which is slightly smaller than the switch insert hole 23, and parts other than the switch part 31f are larger than the switch insert hole 23. Referring to FIG. 3, the switch part 31f of the main body 31 is moved downwards to be inserted into the switch insert hole 23, so that the main body 31 is mounted to the switch insert hole 23. The operation of additionally fastening the main body 31 to the airbag cover 20 is not required.

A guide portion 31c is provided in the back of the main body 31, so that the subsidiary body 32 slides along the guide portion 31c to be seated at a predetermined position or removed from the position. A bracket 31d having an "L"-shaped cross-section is provided in the longitudinal direction of the guide portion 31c. Tubes 31a and 31b each having an internal threaded part are provided around the guide portion 31c, namely, provided at a position opposite to the bracket 31d and a position in the sliding direction of the subsidiary body 32. Reference numeral 34 denotes a connector which is electrically connected to the switch part 31f, and reference numeral 31e denotes a connector mounting hole.

The subsidiary body 32 is supported by the associated wing 41 of the mounting plate 40 and removably secured to the main body 31 and the mounting plate 40. In detail, the subsidiary body 32 and each wing 41 of the mounting plate 40 are fastened to each other via bolts 43, and the subsidiary body 32 and the main body 31 are fastened to each other via piece bolts 33. Further, fastening holes 32d are formed in the upper surface of the subsidiary body 32 to correspond to through holes 42 which are formed in each wing 41, and two ear parts 32a and 32b protrude from the side surface of the subsidiary body 32 to be coupled to the tubes 31a and 31b using the piece bolts 33. Meanwhile, a flange 32c protrudes laterally from the subsidiary body 32 to be fitted into the bracket 31d.

The process of sequentially separating each remote control switch unit 30 from the driver airbag assembly 10 will be described with reference to FIGS. 5A to 5E.

Figure 5A:
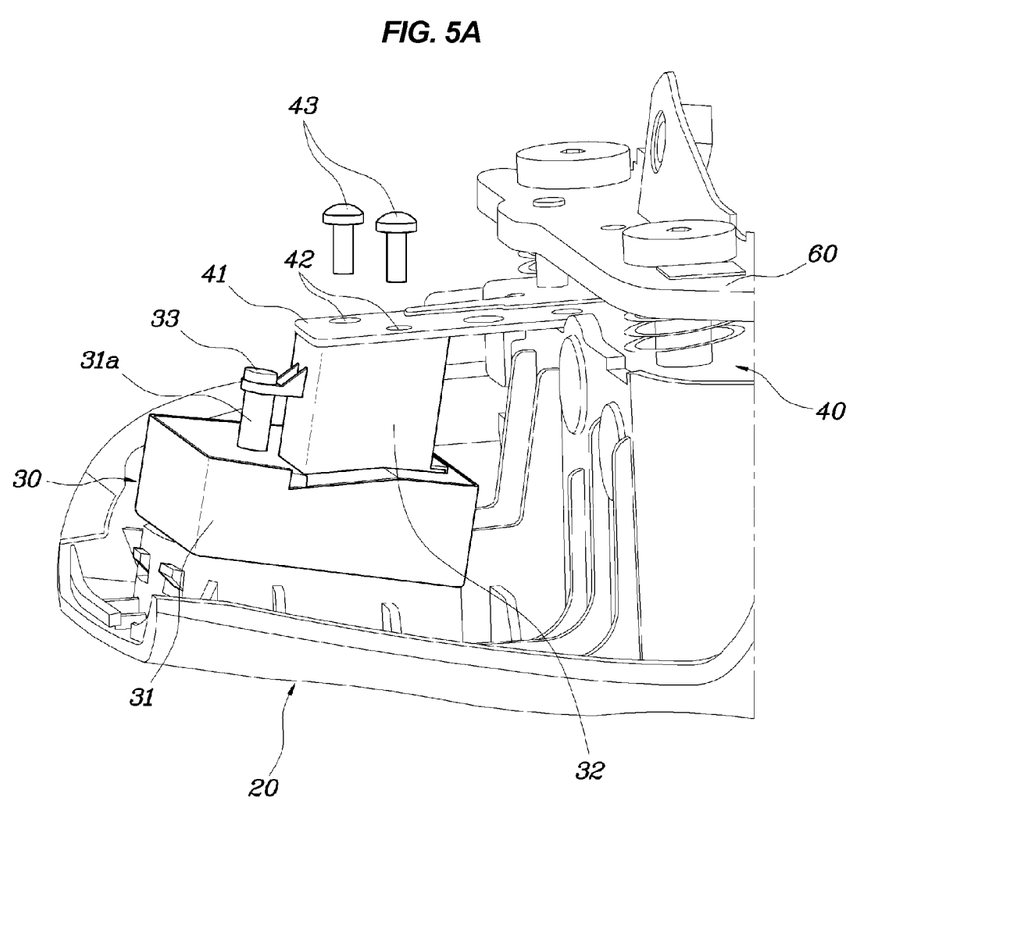
FIGS. 5A to 5E are views sequentially illustrating the process of separating the remote control switch unit from the driver airbag assembly of FIG. 2.
Figure 5B:
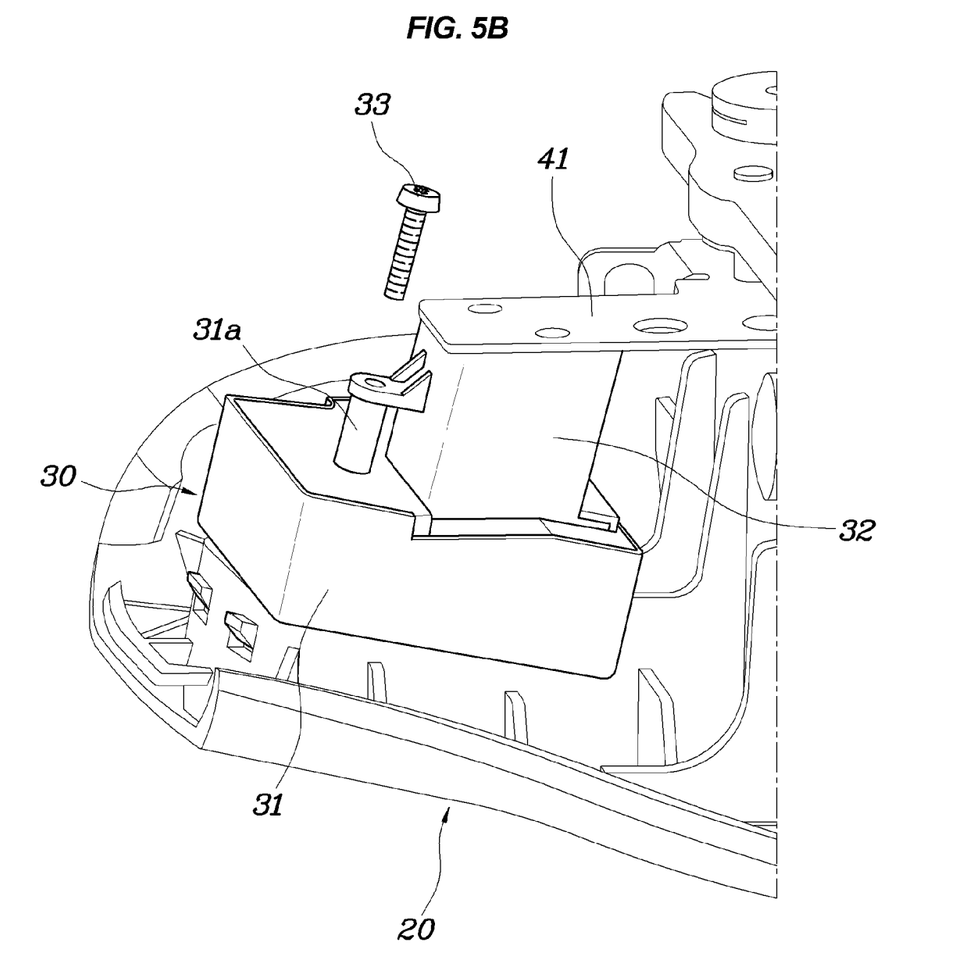

As shown in FIGS. 5A and 5B, as the preparation work for separating the remote control switch unit 30 from the assembly 10, the bolts 43 fastening each wing 41 of the mounting plate 40 to the subsidiary body 32 must be removed (see FIG. 5A). Next, the piece bolts 33 fastening the subsidiary body 32 to the main body 31 must be removed (see FIG. 5B). The subsidiary body 32 corresponds to a member which is supported between the main body 31 and the associated wing 41. Thus, after the subsidiary body 32 has been removed, it is possible to remove the main body 31.

Figure 5C:
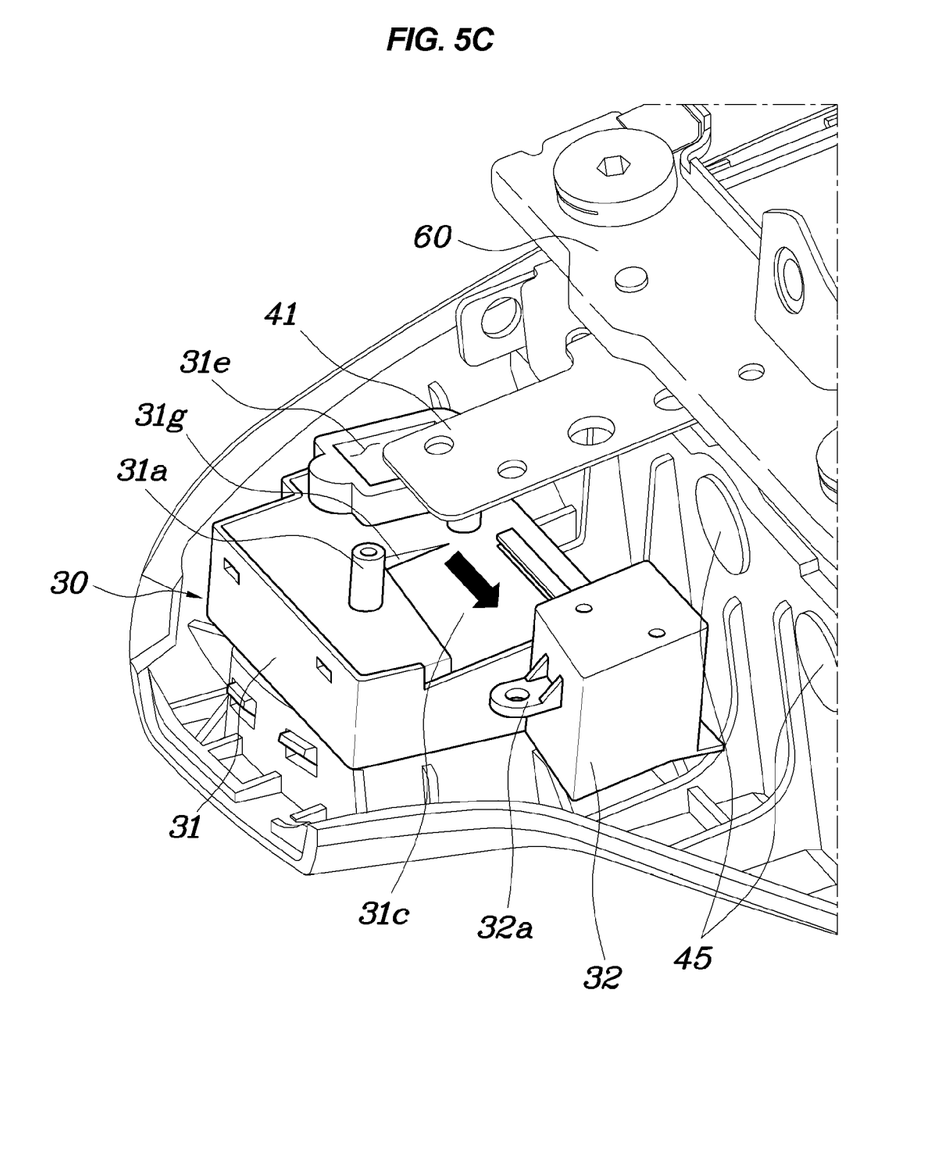

As shown in FIG. 5C, the subsidiary body 32 slides laterally along the guide portion 31c of the main body 31, so that the subsidiary body 32 is removed from its fastening position. A step 31g is provided on the back of the main body 31 corresponding to the fastening position, especially, at the innermost position in the longitudinal direction of the guide portion 31c, thus stopping the subsidiary body 32 at a given position. Meanwhile, when the subsidiary body 32 is pushed along the guide portion 31c to the fastening position, the ear part 32a of the subsidiary body 32 must be positioned at a predetermined height such that it is placed right above the tube 31a.

Figure 5D:
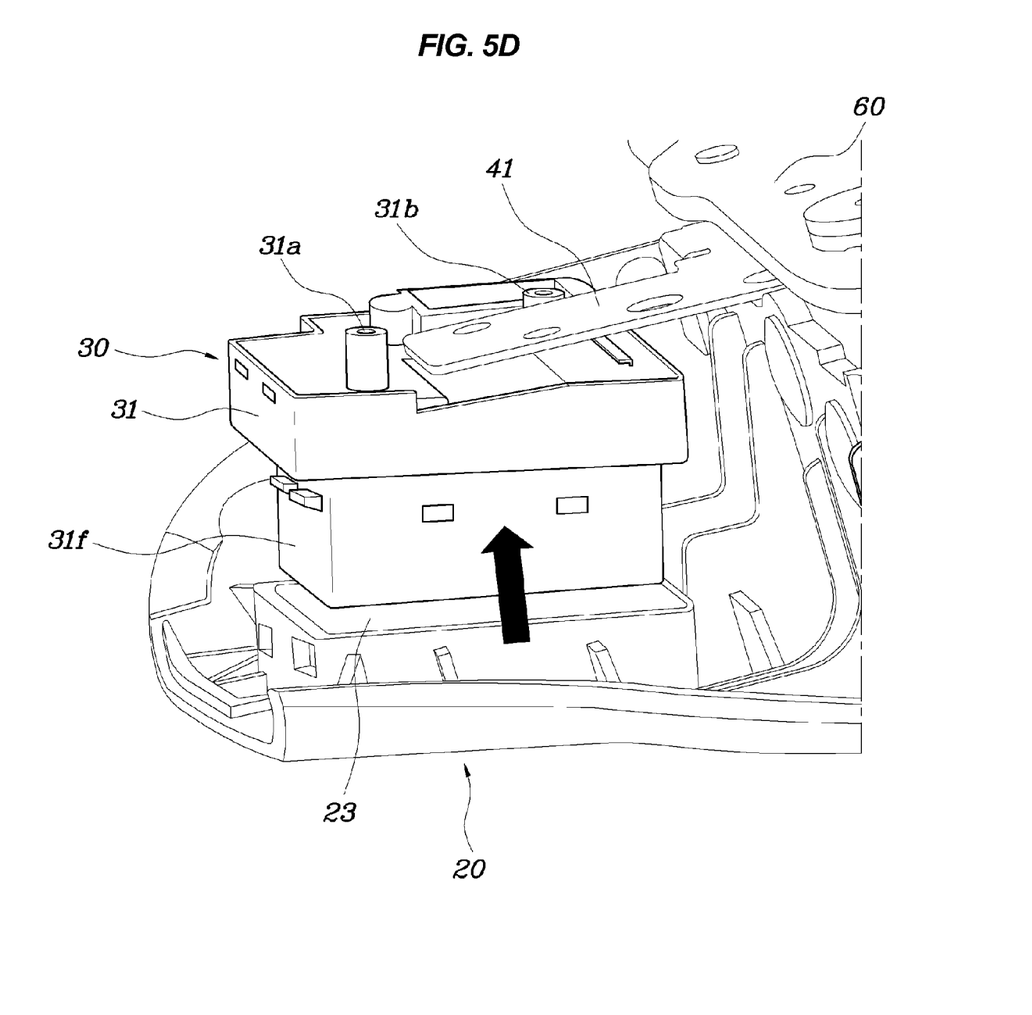
Figure 5E:
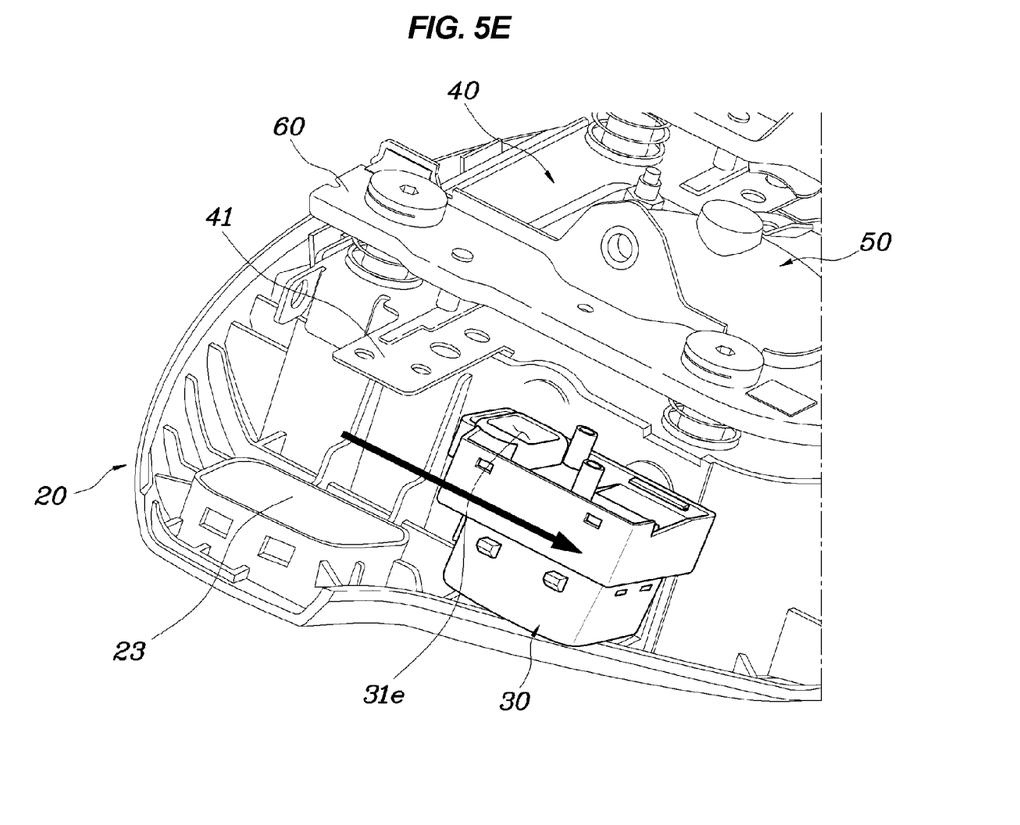

As shown in FIGS. 5D and 5E, after the subsidiary body 32 has been removed, a space corresponding to the height of the subsidiary body 32 is formed. Owing to the space, the main body 31 may be removed from the assembly 10. In detail, the main body 31 is lifted so that the switch part 31f is completely removed from the switch insert hole 23. Thereafter, as the main body 31 moves laterally, the main body 31 is removed from the switch insert hole 23. The height or thickness of the subsidiary body 32 is determined in consideration of the above-mentioned space.

The remote control switch unit 30 may be assembled with the driver airbag assembly 10 in the reverse order of the process of separating the remote control switch unit 30 from the driver airbag assembly 10. Further, the first assembling operation of the driver airbag assembly 10 is performed as follows. That is, in the state where the cushion module 50 is seated in the module insert cavity 22 and the remote control switch unit 30 whose main body 31 and subsidiary body 32 are fastened to each other is seated in the switch insert hole 23, the back of the airbag cover 20 is covered by the mounting plate 40, and each wing 41 and the subsidiary body 32 are fastened to each other using the bolts 43. Thereafter, the airbag cover 20 and the mounting plate 40 are fastened to each other using the rivets.

Meanwhile, the flange 32c is coupled with the bracket 31d to easily guide the subsidiary body 32 along the guide portion 31c while the subsidiary body 32 is separated from the main body 31 or the subsidiary body 32 is assembled with the main body 31. Further, the flange 32c is coupled with the bracket 31d so that the subsidiary body 32 is temporarily secured at the fastening position on the main body 31, thus allowing the main body 31 and the subsidiary body 32 to be easily fastened to each other using the piece bolts 33.

As described above, the present invention provides a driver airbag assembly, which permits the easy separation and replacement of a remote control switch mounted to an airbag cover, regardless of whether the airbag cover and a mounting plate are riveted to each other.

Further, the present invention provides a driver airbag assembly, which does not require an additional process such as a double injection molding process and is simply constructed so that a remote control switch unit comprises two separable members, thus permitting the separation and replacement of the remote control switch unit, therefore reducing the manufacturing cost of the driver airbag assembly.

Although the exemplary embodiment of the present invention has been disclosed for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "left", and "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A driver airbag assembly, comprising:
    an airbag cover including a switch insert hole;
    a cushion module provided in back of the airbag cover and engaged with the airbag cover;
    a mounting plate coupled to the airbag cover in the back thereof to support a rear end portion of the cushion module between the airbag cover and the mounting plate, and having a wing which extends laterally; and
    a remote control switch unit including:
        a main body disposed between the airbag cover and the mounting plate;
        a switch part disposed in the main body and exposed to outside of the airbag cover through the switch insert hole; and
        a subsidiary body interposed and secured between the main body and the wing of the mounting plate and slidable laterally along the main body to be removable from a predetermined position of the main body.

2. The driver airbag assembly as set forth in claim 1, wherein a guide portion is provided in a rear surface of the main body to receive the subsidiary body such that the subsidiary body slides along the guide portion to be seated at the predetermined position or removed from the predetermined position.

3. The driver airbag assembly as set forth in claim 2, wherein at least one tube having an internal threaded part is provided around the guide portion on the rear surface of the main body, and at least one ear part protrudes from a lateral surface of the subsidiary body to be releasably fastened to the tube by a fastening member.

4. The driver airbag assembly as set forth in claim 1, wherein the subsidiary body is removably secured to the main body and the mounting plate.

5. The driver airbag assembly as set forth in claim 4, wherein a bottom portion of the subsidiary body is slidably secured to the main body and an upper portion thereof is removably secured to the wing of the mounting plate.

6. The driver airbag assembly as set forth in claim 5, wherein a flange protrudes laterally from the subsidiary body along a movement direction of the subsidiary body, and a bracket is provided on the main body corresponding to the flange of the subsidiary body so that the flange is slidably fitted into the bracket.

7. The driver airbag assembly as set forth in claim 5, wherein the upper portion of the subsidiary body is removably secured to the wing of the mounting plate by a bolt.

8. The driver airbag assembly as set forth in claim 5, wherein a guide portion is provided in a rear surface of the main body to receive a bottom portion of the subsidiary body such that the subsidiary body slides along the guide portion to be seated at the predetermined position or removed from the predetermined position.

9. The driver airbag assembly as set forth in claim 8, wherein at least one tube having an internal threaded part is provided around the guide portion on the rear surface of the main body, and at least one ear part protrudes from a lateral surface of the subsidiary body to be releasably fastened to the tube by a fastening member.

* * * * *